United States Patent [19]

Mohnot et al.

[11] Patent Number: 4,714,113

[45] Date of Patent: Dec. 22, 1987

[54] ALKALINE WATER FLOODING WITH A PRECIPITATION INHIBITOR FOR ENHANCED OIL RECOVERY

[75] Inventors: Shantilal M. Mohnot, Copley, Ohio; Paritosh M. Chakrabarti, Pittsburgh, Pa.

[73] Assignee: PPG Industries, Inc., Pittsburgh, Pa.

[21] Appl. No.: 938,496

[22] Filed: Dec. 5, 1986

[51] Int. Cl.$^4$ .............................................. E21B 43/22
[52] U.S. Cl. ................................... 166/270; 166/273; 166/275
[58] Field of Search ............... 166/275, 271, 273, 274, 166/270; 252/8.55 D

[56] References Cited

U.S. PATENT DOCUMENTS

| | | | |
|---|---|---|---|
| 2,747,670 | 5/1956 | King et al. | 166/270 |
| 2,807,324 | 9/1957 | King et al. | 166/292 |
| 3,482,631 | 12/1969 | Jones | 166/275 X |
| 3,490,532 | 1/1970 | Carlin | 166/275 X |
| 3,493,051 | 2/1970 | Gogartz | 166/275 X |
| 3,731,741 | 5/1973 | Palmer et al. | 166/275 X |
| 3,768,565 | 10/1973 | Persinski et al. | 166/271 X |
| 3,827,977 | 8/1974 | Miles et al. | 252/8.552 |
| 3,880,237 | 4/1975 | Snavely, Jr. et al. | 166/271 X |
| 4,008,164 | 2/1977 | Watson et al. | 252/8.552 |
| 4,359,093 | 11/1982 | Bernard | 166/273 |
| 4,466,892 | 8/1984 | Chan et al. | 166/275 X |
| 4,487,262 | 12/1984 | Venkatesan et al. | 166/271 |
| 4,502,541 | 3/1985 | Lawson et al. | 166/275 X |

*Primary Examiner*—Stephen J. Novosad
*Attorney, Agent, or Firm*—Irwin M. Stein; Bruce H. Cottrell

[57] ABSTRACT

An enhanced oil recovery method is provided utilizing an alkaline waterflood injection fluid including a water-soluble precipitation inhibitor such as a polyacrylate, an acrylate-containing copolymer, an organophosphonate, a carboxylate-containing organophosphonate or a polymaleic anhydride whereby divalent metal cations dissolved within the injection fluid or within the reservoir water in the immediate vicinity of the injection well are substantially prevented from precipitating. Additionally, the injection fluid preferably provides sufficient alkaline material whereby beyond the immediate vicinity of the injection well the permeability characteristics of the reservoir are modified by precipitation of, e.g., divalent metal hydroxides or divalent metal carbonates.

18 Claims, No Drawings

ALKALINE WATER FLOODING WITH A PRECIPITATION INHIBITOR FOR ENHANCED OIL RECOVERY

This invention relates to a method for the enhanced recovery of oil from an underground reservoir. More particularly, this invention relates to a method for the enhanced recovery of oil by injecting an aqueous solution containing an alkaline material and a water-soluble precipitation inhibitor capable of preventing substantial precipitation of divalent metal salts, e.g., divalent metal hydroxides or divalent metal carbonates in or near the injection well. In another aspect, this invention relates to a method for the enhanced recovery of oil by the controlled precipitation of divalent metal hydroxides or divalent metal carbonates to achieve selective adjustment of permeability in the underground reservoir.

BACKGROUND OF THE INVENTION

Enhanced oil recovery encompasses many methods for increasing the recovery of oil remaining in a reservoir after the natural pressures are insufficient for economic production. Primary recovery from a reservoir often produces only 10 to 30 percent of the oil present in the reservoir. Various supplemental methods have been developed to recover at least a portion of the remaining oil. Several water and chemical flooding methods are common techniques in enhanced oil recovery. These can involve the injection of a fluid such as water from one or more injection wells spaced at some distance from one or more producing wells to force additional oil toward the producing wells. The injection fluid can further include one or more chemicals, injected either together or in sequence to the reservoir. Some recovery methods involve the injection of surfactants, while a method such as caustic flooding uses inexpensive chemicals such as sodium hydroxide which can react in situ to provide surfactants and increase oil production through mechanisms such as lowering the interfacial tension between the injected fluid and the oil.

Caustic flooding or more generally alkaline flooding is a process in which the pH value of the injected flood water is increased to a value above about 8, more usually above about 10, and most usually between about 10 and 14 by adding sodium hydroxide or another alkaline chemical thereto. The most common alkaline chemical used is sodium hydroxide because of its ready availability and low cost. Other alkaline chemicals, which can accomplish the same result, include sodium carbonate, sodium bicarbonate, sodium silicates, sodium borates, sodium phosphates, potassium hydroxide, potassium carbonate, potassium bicarbonate, potassium silicate, potassium borates ammonia, and selected amines such as methylamine or polyethylenimine. Benefits of alkaline flooding can include improvement of surfactant floods and wettability alteration.

Alkaline flooding processes are complicated by the fact that as the alkaline flood water is injected into the reservoir, multivalent metal cations, particularly divalent metal cations present in the injection water or reservoir water can precipitate. The troublesome divalent metal cations are typically calcium, magnesium and barium. The precipitation of divalent metal salts, e.g., divalent metal hydroxides or divalent metal carbonates can plug the injection wall or the reservoir in the vicinity of the injection well. Such plugging can hinder the injection of further alkaline flood water. While the problem of calcium hydroxide and magnesium hydroxide scales has been generally overlooked, U.S. Pat. No. 4,466,892 does describe adding lignosulfonate to alkaline injection water containing divalent metal cations to prevent substantial precipitation of hydroxides, such as calcium hydroxide.

The prior art has suggested softening the injection water through ion exchange to remove the divalent metal cations whereby to prevent precipitation within the injection well. Another suggestion has been to remove precipitated hydroxides or carbonates from the injection water by filtration before the alkaline flood water is injected into the reservoir. While this can eliminate plugging of the injection well, it may not prevent plugging within the reservoir in the vicinity of the injection well as aqueous water within the reservoir, e.g., connate water, can also contain significant levels of dissolved divalent metal cations. Therefore, still another suggestion has been to inject a preflush of water substantially free of divalent metal cations into the reservoir in order to condition the reservoir and reduce or prevent plugging in the vicinity of the injection well.

While it is recognized that plugging of a reservoir in the immediate vicinity of the injection well is detrimental, it is further recognized that reservoirs are typically heterogeneous, i.e., the reservoirs are comprised of stratified layers of varying permeability and can contain fractures, cracks, fissures, or streaks of varying permeability that cause the injected flood water to advance through such reservoirs nonuniformly. The injected aqueous solution will tend to flow or channel into the areas of higher permeability and thus bypass those portions of a reservoir having lower permeability. This can result in the reduced recovery of oil. Various methods have been suggested for adjusting the permeability of a reservoir including the precipitation of an insoluble material within the reservoir or the reaction of at least two materials whereby to plug the highly permeable portions of the reservoir. Plugging the highly permeable portions of the reservoir forces the aqueous solution into the lower permeable areas and can result in increased oil recovery.

It is desirable to have an improved alkaline injection fluid for enhanced oil recovery which would prevent substantial precipitation and plugging by divalent metal salts, e.g., divalent metal hydroxides and divalent metal carbonates in the injection well or in the immediate vicinity of the injection well within the reservoir. Furthermore, it is desirable that the alkaline injection fluid allow the formation of precipitates such as divalent metal hydroxides away from the immediate vicinity of the injection well whereby to alter the permeability and flow-profile of the reservoir.

SUMMARY OF THE INVENTION

The present invention provides a process for the enhanced recovery of oil from a subterranean reservoir penetrated by at least one injection well and at least one production well, the reservoir including an aqueous phase containing dissolved divalent metal cations. The process includes injection through an injection well an aqueous solution containing an alkaline material sufficient to provide a pH of above about 8, more preferably above about 10, and most preferably from about 10 to 14, to the injected solution, and a predetermined amount of a water-soluble precipitation inhibitor selected from the group consisting of polyacrylates, acrylate-containing copolymers, e.g., copolymers of an acrylate and a monomer from the group consisting of acrylamidomethylpropylsulfonic acid, acrylamide, hydroxyalkylacrylate, or vinylsulfonic acid, polymaleic anhydrides, organic phosphonates, or carboxylate-containing organic phosphonates, and alkali metal or ammonium salts thereof, in an amount sufficient to prevent substantial precipitation of divalent metal hydroxides or divalent metal carbonates in the immediate vicinity of the injection well. When the injected aqueous solution also includes divalent metal cations, the precipitation inhibitor further prevents substantial precipitation of divalent metal hydroxides or divalent metal carbonates in the injection well. In a further aspect of the invention, the injected aqueous solution contains sufficient alkaline material so that beyond the immediate vicinity of the injection well, divalent metal hydroxides or divalent metal carbonates are precipitated whereby to modify the permeability and flow-profile of the subterranean reservoir.

In another aspect of this invention, the process further includes injecting an aqueous solution of a water-soluble divalent metal salt after the injection of the aqueous solution containing the alkaline material and the water-soluble precipitation inhibitor. A spacer fluid, such as water, can separate the aqueous solution of a water-soluble divalent metal salt and the aqueous solution containing the alkaline material and the water-soluble precipitation inhibitor to prevent premature mixing of the solutions.

DETAILED DESCRIPTION OF THE INVENTION

This invention involves an improved method for alkaline flooding of an oil-bearing subterranian reservoir containing an aqueous phase having divalent metal cations dissolved therein. For example, the reservoir water may have dissolved calcium or magnesium at levels which present problems upon injection of the alkaline floodwater. The improved method of alkaline flooding involves injection of an alkaline solution having a pH above about 8, more preferably above about 10, and most preferably of from about 11 to 14, the solution including a water-soluble precipitation inhibitor present in an amount sufficient to prevent substantial precipitation of divalent metal hydroxides or divalent metal carbonates. In alkaline flooding the most commonly used alkaline material is sodium hydroxide. However, other chemicals such as sodium carbonate, sodium bicarbonate, sodium silicates, sodium borates, sodium phosphates, potassium hydroxide, potassium silicates, potassium carbonate, potassium bicarbonate, potassium borates ammonia, and amines such as lower alkyl amines, e.g., methylamine, dimethylamine, trimethylamine, ethylamines, propylamines and butylamines, lower alkanol amines, e.g., 2-aminoethanol, 2-amino-1-propanol, 2-amino-2-methyl-1-propanol, and 2-amino-1-butanol, cyclic amines, e.g., imidazole, or alkylenimine polymers, e.g., polyethylenimine, may accomplish the smae result.

Choice of alkaline material controls the pH range of the aqueous solution, which can affect the type and magnitude of divalent metal salt precipitation. Various divalent metal-containing salts such as calcium hydroxide, magnesium hydroxide and calcium carbonate can cause troublesome precipitation or plugging problems in enhanced oil recovery. For example, use of sodium hydroxide can provide the aqueous solution with high pH values whereat magnesium hydroxide or calcium hydroxide may precipitate. In contrast, use of sodium bicarbonate as the alkaline material provides a solution pH range whereat calcium carbonate is the principal precipitate.

The injection water used in this invention can come from any convenient source. In the present process, the injection water does not need to be free of divalent metal ions such as calcium, magnesium and barium. For example, the injection water can be fresh water, soft water, brine, seawater or water previously removed from the reservoir. The choice of injection water may vary depending on the choice of alkaline material to minimize the precipitation problem. For example, seawater may contain magnesium levels such as to exclude sodium hydroxide as the alkaline material unless such water is pretreated to reduce the magnesium levels. The effectiveness of the alkaline flooding may be optimized by adding combinations of preformed surfactants or alcohols, cosurfactants, viscosity modifiers or corrosion inhibitors either before, with, or after the addition of the alkaline solution.

In one embodiment, sodium hydroxide, as the alkaline material, is mixed with injection water to form an aqueous solution having a pH in the range from about 11 to 14 before introduction into the reservoir. The solution can range from about 0.1 to about 10 percent or more sodium hydroxide by weight, more preferably from about 0.1 to about 5 percent by weight and most preferably from about 0.1 to about 1 percent by weight. The actual amount of sodium hydroxide used depends upon the characteristics of the rock, the oil, and composition of water in the reservoir.

The aqueous solution injected into the reservoir includes a predetermined amount of a water-soluble precipitation inhibitor. The precipitation inhibitor can be a water-soluble polymer such as a polyacrylate, e.g., polyacrylic acid or polymethacrylic acid, an acrylate- or methacrylate-containing copolymer, e.g., a copolymer of acrylic acid and a hydroxyalkyl acrylate, the hydroxyalkyl group preferably containing from 2 to 4 carbon atoms, e.g., hydroxyethylacrylate, a copolymer of acrylic acid and acrylamidomethylpropylsulfonic acid, a copolymer of acrylic acid and acrylamide or a copolymer of acrylic acid and vinylsulfonic acid, polymaleic anhydride, and alkali metal or ammonium salts thereof. The polyacrylates or acrylate-containing copolymers generally have a number average molecular weight of from about 500 to 50,000, preferably from about 500 to 10,000 and more preferably from about 500 to 5,000. Further, the precipiation inhibitor can be an organo phosphonate, a carboxylate-containing organo phosphonate or alkali metal and ammonium salts thereof, e.g., aminotrimethylenephosphonic acid, hydroxyethanediphosphonic acid, ethylenediaminetetramethylenephosphonic acid, diethylenetriaminepentamethylenephosphonic acid, hexamethylenediaminetetramethylenephosphonic acid, phosphinopolycarboxylic acid and phosphonobutane tricarboxylic acid. Combinations of the enumerated precipitation inhibitors may also be employed.

The water-soluble precipitation inhibitor is present in the injected aqueous solution in an amount sufficient to prevent substantial precipitation of divalent metal salts, e.g., divalent metal hydroxides or carbonates, in the injection well or in the reservoir within the immediate vicinity of the injection well. By "substantial precipitation" is meant precipitation of divalent metal salts, e.g., divalent metal hydroxides or divalent metal carbonates in amounts sufficient to plug the injection well or the reservoir within the immediate vicinity of the injection well so that the pressure required to force the aqueous solution into the reservoir increases beyond the capabilities of a chosen injection pump or beyond the fracturing pressure of the reservoir. By "immediate vicinity of the injection well" is generally meant an area from within several feet to several dozen feet of the injection well, although the precise distance may vary depending upon well spacings, the reservoir rock characteristics such as heterogeneity and fracturing strength, and the pump capabilities.

Generally, the amount of water-soluble precipitation inhibitor in the aqueous solution will be from about 0.1 to about 500 parts of the water-soluble precipitation inhibitor per million parts of aqueous solution (ppm), more preferably about 0.1 to about 100 ppm, and most preferably from about 1 to about 25 ppm. The necessary amount of the water-soluble precipitation inhibitor is generally determined by measuring the concentration of divalent metal ions present within the injection water and within the reservoir. Sufficient precipitation inhibitor is then added to provide protection against premature precipitation, plugging, and a resultant increase in pump pressure necessary to inject further fluid.

Selection of the water-soluble precipitation inhibitor can be affected by the temperature of the reservoir. The precipitation inhibitors have varying efficiencies under different temperature conditions. Generally, the reservoir temperature may vary from about 20° C. to about 120° C., usually below about 100° C. Generally, the water-soluble precipitation inhibitors have a decreasing effectiveness with time. That is, with the passage of time, the water-soluble precipitation inhibitors of this invention will provide reduced protection against the precipitation of divalent metal hydroxides or divalent metal carbonates. This is beneficial in one embodiment of the present method wherein it is desired to allow the precipitation of divalent metal hydroxides or divalent metal carbonates outside the immediate vicinity of the injection well to modify the permeability and flow-profile of the reservoir.

In heterogeneous reservoirs having variable permeabilities, the flow of the flooding fluid will predominantly occur through the portions of the reservoir having higher permeability. It is desired to adjust the permeability of the reservoir to improve the flow-profile and sweep efficiency of the fluid throughout the entire reservoir. In one embodiment of this invention, sufficient alkaline material is included in the injected aqueous solution so that beyond the immediate vicinity of the injection well, the alkaline material can react with divalent metal cations dissolved in the water within the reservoir and precipitate as divalent metal hydroxides or divalent metal carbonates. For example, the chosen precipitation inhibitor can have reduced effectiveness after some period of time, e.g., several weeks, whereafter the substantial precipitation of divalent metal hydroxides or carbonates can occur at reservoir locations away from the immediate vicinity of the injection well. The precipitation of divalent metal hydroxides or divalent metal carbonates can partially plug the highly permeable portions of the reservoir and force the remaining aqueous solution and other drive fluids into those areas of the reservoir having lower permeabilities. In this manner, the sweep efficiency of the fluids across the entire reservoir is improved.

In one aspect of this invention, an aqueous solution of a water-soluble divalent metal salt is injected into the reservoir after the injection of the aqueous solution containing alkaline material and the water-soluble precipitation inhibitor. In this manner the concentration of divalent metal cations may be controlled to alter the placement and precipitation of divalent metal hydroxides or divalent metal carbonates. When the solution of the water-soluble divalent metal salt is injected through the same injection well as the alkaline solution, a spacer fluid such as water can be used to separate the aqueous solution containing the alkaline material and the water-soluble precipitation inhibitor from the aqueous solution of water-soluble divalent metal salt to prevent premature contact of the solutions. Optionally, the solution of water-soluble divalent metal salt may be injected through another injection well. By measuring the water flow and water to oil ratio at a production well, the adjustment of the permeability of the reservoir may be measured.

This invention is further illustrated by the following examples, which are illustrative only of the invention, and are not intended as limiting the scope of the invention, which is defined by the applied claims.

EXAMPLES 1-13

The precipitation inhibitors of the Examples were tested to measure the effectiveness in preventing calcium hydroxide precipitation in aqueous systems wherein sodium hydroxide was used as the alkaline material.

Equal volumes of a first aqueous solution containing 0.2 Normal (N) sodium chloride and 1000 parts per million $Ca^{++}$ (added as $CaCl_2$) and a second aqueous solution containing 0.2N sodium chloride and 0.5N sodium hydroxide were mixed with the water soluble precipitation inhibitor. The precipitation inhibitor was added to the admixture as a 1 percent by weight aqueous solution in an amount sufficient to provide the mixture with a precipitation inhibitor concentration of 10 milligram per liter (equivalent to parts per million). A control admixture was conducted without any precipitation inhibitor. The pH of the final admixtures was about 13. The admixtures were maintained at a temperature of 23° C. for 24 hours, then filtered through a 0.2 micron membrane filter (Gelman Acrodisc ®) to remove any precipitate, and analyzed for calcium ions in solution by atomic absorption. The measurements in ppm calcium were converted to percent inhibition of calcium hydroxide.

The results are presented in Table 1. The number average molecular weight ($\overline{Mn}$) of acrylate-containing precipitation inhibitors are given in the table.

TABLE 1

| Ex-ample | Precipitation Inhibitor | 23° C. ppm calcium | percent inhibition |
|---|---|---|---|
| 1 | none | 111 | 0 |
| 2 | polyacrylic acid ($\overline{Mn}$ 850) | 436 | 84 |
| 3 | acrylic acid (AA) and hydroxyethyl acrylate (HEA) copolymer (10:1 mole ratio AA:HEA, $\overline{Mn}$ 1000) | 449 | 87 |
| 4 | acrylic acid and acrylamido-methylpropylsulfonic acid (AMPS) copolymer (10:1 mole ratio AA:AMPS, $\overline{Mn}$ 900) | 338 | 58 |
| 5 | sodium polymaleate | 369 | 66 |
| 6 | acrylic acid and vinyl sulfonic acid copolymer MW 60,000 | 317 | 53 |

TABLE 1-continued

| Example | Precipitation Inhibitor | 23° C. ppm calcium | percent inhibition |
|---|---|---|---|
| 7 | hydroxyethanediphosphonic acid (HEDP) | 212 | 26 |
| 8 | diethylenetriaminepentamethylene phosphonic acid (DETPMP) | 420 | 79 |
| 9 | aminotrimethylenephosphonic acid (ATMP) | 504 | 101 |
| 10 | ethylenediaminetetramethylenephosphonic acid (EDTMP) | 512 | 103 |
| 11 | hexamethylenediaminetetramethylene phosphonic acid (HMDATMP) | 509 | 102 |
| 12 | phosphonobutane tricarboxylic acid (PBTC) | 511 | 103 |
| 13 | acrylic acid and acrylamide copolymer | 331 | 57 |

EXAMPLES 14–21

The inhibition efficiency was measured on selected precipitation inhibitors at 80° C. Equal volumes of a first aqueous solution containing a 0.2N sodium chloride and 400 ppm Calcium and a second aqueous solution containing 0.2N sodium chloride and 0.5N sodium hydroxide were mixed with an amount of the precipitation inhibitor sufficient to provide 25 ppm. The admixtures were maintained for 24 hours at 80° C., then filtered and analyzed as in Examples 1–13. The results are presented in Table 2. Average values are presented where more than one run was conducted under identical conditions.

TABLE 2

| Example | Polyelectrolyte | 80° C. ppm calcium | percent inhibition |
|---|---|---|---|
| 14 | none | 46 | 0 |
| 15 | polyacrylic acid ($\overline{M}n$ 2100) | 175 | 84 |
| 16 | polyacrylic acid ($\overline{M}n$ 1000) | 203 | 102 |
| 17 | polyacrylic acid ($\overline{M}n$ 5000) | 105 | 38 |
| 18 | DETPMP | 190 | 94 |
| 19 | ATMP | 176 | 84 |
| 20 | EDTMP | 153 | 69 |
| 21 | HMDATMP | 139 | 60 |

EXAMPLE 22

The effect of time on a precipitation inhibitor was measured in identical containers of admixed solution containing 200 ppm calcium (added as CaCl$_2$), 0.25N sodium hydroxide, 0.20N sodium chloride, and 20 ppm phosphonobutane tricarboxylic acid. The test solutions were maintained at 80° C. After the predetermined time interval, the solution in a container was filtered and analyzed for calcium ions as before. The results are presented in Table 3 and demonstrate the diminished effectiveness over time of the precipitation inhibitor.

TABLE 3

| Time | Percent (%) Inhibition |
|---|---|
| 1 day | 88 |
| 1 week | 60 |
| 4 weeks | 48 |
| 8 weeks | 41 |
| 12 weeks | 29 |

EXAMPLE 23

The inhibition of magnesium hydroxide with DETPMP was determined in a solution containing 200 ppm magnesium (added as MgCl$_2$), 0.2N NaCl, 10 ppm DETPMP and a pH of 10.23 (adjusted by addition of methylamine and hydrochloric acid). A second identical solution absent any precipitation inhibitor served as a control. The solutions were maintained at 80° C. After one day the solutions were filtered and analyzed for magnesium by atomic absorption. The results are presented in Table 4 and demonstrate the inhibition of magnesium hydroxide precipitate by the use of the precipitation inhibitor.

TABLE 4

|  | Initial Mg ppm | Percent Inhibition | Observations |
|---|---|---|---|
| Control Solution | 200 | 0 | precipitate |
| Solution w/inhibitor | 200 | 71 | clear |

EXAMPLE 24

The inhibition of calcium carbonate was determined in a solution containing 200 ppm calcium (added as CaCl$_2$), 1 percent by weight of sodium chloride, 1 percent by weight sodium bicarbonate to provide the alkaline pH and 20 ppm of a polyacrylate as the precipitation inhibitor (Goodrite ® K-752, available from B. F. Goodrich, $\overline{M}n$ 1000). After one day at 23° C., the solution was filtered and analyzed as before for calcium ions. Inhibition was measured as 79 percent in comparison to a solution without precipitation inhibitor. An identical test except with 1000 ppm calcium in the initial solution was determined to have 49 percent inhibition after one day.

What is claimed is:

1. A process for the enhanced recovery of oil from a subterranean reservoir penetrated by at least one injection well and at least one production well wherein the reservoir includes an aqueous phase containing dissolved divalent metal cations, the process comprising injecting through an injection well an aqueous solution including an alkaline material sufficient to provide a solution pH of above about 8 and a predetermined amount of water-soluble precipitation inhibitor selected from the group consisting of polyacrylates and acrylate-containing copolymers having a number average molecular weight of from about 500 to about 50,000, polymaleic anhydrides, organo-phosphonates or carboxylate-containing organo-phosphonates selected from the group consisting of aminotrimethylenephosphonic acid, hydroxyethanediphosphonic acid, ethylenediaminetetramethylenephosphonic acid, diethylenetriaminepentamethylenephosphonic acid, hexamethylenediaminetetramethylenephosphonic acid, phosphinopolycarboxylic acid, phosphenobutane tricarboxylic acid and alkali metal or ammonium salts thereof, said predetermined amount being sufficient to prevent substantial precipitation of divalent metal hydroxides or divalent metal carbonates in the injection well or the immediate vicinity of the injection well.

2. The process of claim 1 wherein the alkaline material is selected from the group consisting of sodium hydroxide, sodium carbonate, sodium bicarbonate, sodium silicates, sodium borates, sodium phosphates, potassium hydroxide, potassium carbonate, potassium bicarbonate, potassium silicates, potassium borates, ammonia, lower alkylenimine polymers, lower alkanol amines and lower alkyl amines.

3. The process of claim 2 wherein the injected aqueous solution includes dissolved divalent metal cations.

4. The process of claim 3 wherein the aqueous solution is prepared by adding the water-soluble precipitation inhibitor to an aqueous solution including divalent metal cations and subsequently adding the alkaline material.

5. The process of claim 1 wherein the injected aqueous solution contains sufficient alkaline material so that beyond the immediate vicinity of the injection well the permeability and flow-profile of the subterranean reservoir is modified by precipitation of divalent metal salts.

6. The process of claim 1 wherein the polyacrylates or acrylate-containing copolymers have a number average molecular weight of from about 500 to 10,000.

7. The process of claim 1 wherein the amount of water-soluble precipitation inhibitor in the aqueous solution is from about 0.1 to about 500 ppm.

8. The process of claim 7 wherein the alkaline material is sodium hydroxide and the pH of the aqueous solution is from about 11 to 14.

9. The process of claim 7 wherein the alkaline material is sodium carbonate and the pH of the aqueous solution is from about 10.5 to 11.5.

10. A process for the enhanced recovery of oil from a subterranean reservoir penetrated by at least one injection well and at least one production well wherein the reservoir includes an aqueous phase containing dissolved divalent metal cations, the process comprising injecting through an injection well an aqueous solution including an alkaline material sufficient to provide a solution pH of above about 8 and a predetermined amount of a polyacrylate water-soluble precipitation inhibitor having a number average molecular weight of from about 500 to about 50,000 selected from the group consisting of (a) homopolymers of acrylic acid and methacrylic acid, and (b) acrylate-containing copolymers selected from the group consisting of copolymers of acrylic acid or methacrylic acid and a material selected from the group consisting of hydroxyalkyl acrylates wherein the hydroxyalkyl contains from two to four carbon atoms, acrylamidomethylpropylsulfonic acid, acrylamide and vinyl sulfonic acid.

11. The process of claim 10 wherein the alkaline material is selected from the group consisting of sodium hydroxide, sodium carbonate, sodium bicarbonate, sodium silicates, sodium borates, sodium phosphates, potassium hydroxide, potassium carbonate, potassium bicarbonate, potassium silicates, potassium borates, ammonia, lower alkylenimine polymers, lower alkanol amines and lower alkyl amines.

12. The process of claim 10, wherein the polyacrylate precipitation inhibitor has a number average molecular weight of from about 500 to 10,000 and the amount of inhibitor in the aqueous solution is from about 0.1 to about 500 ppm.

13. The process of claim 10 wherein the alkaline material is sodium hydroxide and the pH of the aqueous solution is from about 11 to 14.

14. The process of claim 13 wherein the polyacrylate precipitation inhibitor has a number average molecular weight of from about 500 to 10,000 and the amount of inhibitor in the aqueous solution is from about 0.1 to about 500 ppm.

15. The process of claim 10 wherein the alkaline material is sodium carbonate and the pH of the aqueous solution is from about 10.5 to 11.5.

16. The process of claim 15 further comprising injecting through an injection well an aqueous solution of a water-soluble divalent metal salt after the injection of the aqueous solution including the alkaline material and the water-soluble precipitation inhibitor.

17. The process of claim 16 wherein the injected aqueous solution of a water-soluble divalent metal salt and the injected aqueous solution including the alkaline material and the water-soluble precipitation inhibitor are separated by a spacer fluid.

18. The process of claim 15, wherein the polyacrylate precipitation inhibitor has a number average molecular weight of from about 500 to 10,000 and the amount of inhibitor in the aqueous solution is from about 0.1 to about 500 ppm.

* * * * *